US010275480B1

(12) United States Patent
Evenson

(10) Patent No.: US 10,275,480 B1
(45) Date of Patent: Apr. 30, 2019

(54) IMMEDIATELY-CONSISTENT LOCK-FREE INDEXING FOR DISTRIBUTED APPLICATIONS

(71) Applicant: Amazon Technologies, Inc., Seattle, WA (US)

(72) Inventor: Andrew Ross Evenson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 316 days.

(21) Appl. No.: 15/184,943

(22) Filed: Jun. 16, 2016

(51) Int. Cl.
*G06F 17/30* (2006.01)

(52) U.S. Cl.
CPC .... *G06F 17/3033* (2013.01); *G06F 17/30327* (2013.01)

(58) Field of Classification Search
CPC ......... G06F 17/30327; G06F 17/30336; G06F 17/30958; G06F 17/30321; G06F 17/30362; G06F 17/30312; G06F 2201/805; G06F 17/2235; G06F 17/3002; G06F 17/30613; G06F 17/30619; H04N 19/96; H04N 19/30
See application file for complete search history.

(56) References Cited

U.S. PATENT DOCUMENTS

| | | | |
|---|---|---|---|
| 7,428,220 B1 | 9/2008 | Caronni et al. | |
| 7,974,221 B2 | 7/2011 | Tamassia et al. | |
| 8,510,304 B1 | 8/2013 | Briggs et al. | |
| 8,775,817 B2 | 7/2014 | Ransom et al. | |
| 8,924,365 B2 | 12/2014 | Myers et al. | |
| 2008/0114787 A1* | 5/2008 | Kashiyama | G06F 17/30312 |
| 2012/0259860 A1* | 10/2012 | Sharman | G06F 17/30011 707/741 |
| 2014/0074841 A1* | 3/2014 | Majnemer | G06F 17/30327 707/737 |
| 2016/0139997 A1* | 5/2016 | Quiane Ruiz | G06F 17/30342 707/692 |
| 2017/0255708 A1* | 9/2017 | Cho | G06F 17/30321 |

OTHER PUBLICATIONS

Wikipedia, "Distributed has table", Retrieved from URL: https://en.wikipedia.org/wiki/Distributed_hash_table on May 8, 2016, pp. 1-9.

(Continued)

*Primary Examiner* — Augustine K. Obisesan
(74) *Attorney, Agent, or Firm* — Robert C. Kowert; Meyertons, Hood, Kivlin, Kowert & Goetzel, P.C.

(57) ABSTRACT

An index handler determines, with respect to a key to be inserted into an index, that a candidate destination node of the index meets a split criterion. The index handler generates and embeds a deferred split descriptor comprising an identifier of a new node within the destination node. Before an insert-completed indication is provided, the destination node is written to a back-end data store without acquiring a lock and without writing out the new node to the back-end data store. During the traversal of the index, the index handler identifies another deferred split descriptor indicating a second new node. After providing the indication that the key was successfully inserted, the index handler writes the second new node to the back-end data store.

21 Claims, 13 Drawing Sheets

(56) References Cited

OTHER PUBLICATIONS

"Amazon DynamoDB Developer Guide", Amazon Web Services, API Version Aug. 10, 2012, pp. 1-815.
Wikipedia, "Merkle tree", Retrieved from URL: https://en.wikipedia.org/wiki/Merkle_tree on Apr. 5, 2016, pp. 1-5.
"Performing Conditional Writes with Condition Expression", Amazon DynamoDB, Retrieved from URL: http://docs.aws.amazon.com/amazondynamodb/latest/developerguide/Expressions.SpecifyingConditions.html on May 8, 2016, pp. 1-9.
Sriram Ramabhadran, et al., "Prefix Hash Tree an Indexing Data Structure over Distributed Hash Tables", in the Proceedings of the 23rd ACM Symposium on Principles of Distributed Computing, Jul. 2004, pp. 1-10.

\* cited by examiner

Initial inserts into empty index

Example 601 →

| List key to insert | k8 |
|---|---|
| Nodes read from data store to reach candidate destination node (in order) | None (empty index) |
| Critical write | root() [k8] |
| Non-critical write(s) | None |

Example 603 →

| List key to insert | k88 |
|---|---|
| Nodes read | root() [k8] |
| Critical write | root() [k8, k88] |
| Non-critical write(s) | None |

Example 605 →

| List key to insert | k69 |
|---|---|
| Nodes read | root() [k8, k88] |
| Critical write | root() [k69, k8, k88] |
| Non-critical write(s) | None |

Example 607 →

| List key to insert | k58 |
|---|---|
| Nodes read | root() [k69, k8, k88] |
| Critical write | root() [k58, k69, k8, k88] |
| Non-critical write(s) | None |

*FIG. 6*

Root meets split criterion

Example 701

| List key to insert | k63 |
|---|---|
| Nodes read | root() [k58,k69, k8, k88] |
| Critical write | root() [c796f(k69) [k58, k63, k69]], [c6eaa() [k8, k88]] |
| Non-critical write(s) | None |

Root's keys are distributed among two deferred split descriptors 720

Deferred root split performed

Example 703

| List key to insert | k9 |
|---|---|
| Nodes read | root() [c796f(k69) [k58, k63, k69]], [c6eaa() [k8, k88]] |
| Critical write | c6eaa() [k8, k88, k9] |
| Non-critical write(s) (2) | 1 → c796f(k69) [k58, k63, k69]<br>2 → root() [c796f(k69), c6eaa()] |

Only one deferred split is a critical write 725

Example 705

| List key to insert | k83 |
|---|---|
| Nodes read (2) | 1 → root() [c796f(k69), c6eaa()]<br>2 → c6eaa()[k8, k88, k9] |
| Critical write | c6eaa() [k8,k83, k88, k9] |
| Non-critical write(s) | None |

Example 707

| List key to insert | k10 |
|---|---|
| Nodes read (2) | 1 → root() [c796f(k69), c6eaa()]<br>2 → c796f(k69)[k58, k63, k69] |
| Critical write | c796f(k69) [k10, k58, k63, k69] |
| Non-critical write(s) | None |

*FIG. 7*

Leaf meets split criterion

Example 801

| List key to insert | k76 |
|---|---|
| Nodes read (2) | 1 → root() [c796f(k69), c6eaa()]<br>2 → c6eaa() [k8, k83, k88, k9] |
| Critical write | c6eaa(k83) [k76, k8, k83] [1c550() [k88, k9]] |
| Non-critical write(s) | None |

Only one deferred split descriptor is created (with approx. half the values of "tail" end); update of parent's child reference is deferred 821

Example 803

| List key to insert | k21 |
|---|---|
| Nodes read (2) | 1 → root() [c796f(k69), c6eaa()]<br>2 → c796f(k69) [k10, k58, k63, k69] |
| Critical write | c796f(k58) [k10, k21, k58] [f0d30(k69) [k63, k69]] |
| Non-critical write(s) | None |

Deferred leaf split performed

Example 805

| List key to insert | k59 |
|---|---|
| Nodes read (2) | 1 → root() [c796f(k69), c6eaa()]<br>2 → c796f(k58) [k10, k21,k58] [f0d30(k69) [k63, k69]] |
| Critical write | f0d30(k69) [k59, k63, k69]] |
| Non-critical write(s) | root() [c796f(k58), f0d30(k69),c6eaa()] | c796f update (indicating actual split of f0d30) is deferred 823

Root's child pointers are updated in non-critical write 825

*FIG. 8*

Insert to head end of leaf node with existing deferred split descriptor

Example 901

| List key to insert | k79 |
|---|---|
| Nodes read (2) | 1 → root() [c796f(k58), f0d30(k69), c6eaa()]<br>2 → c6eaa(k83) [k76, k8, k83] [1c550() [ k88, k9]] |
| Critical write | c6eaa(k83) [k76, k79, k8, k83] [1c550() [k88, k9]] |
| Non-critical write(s) (2) | 1 → 1c550() [k88, k9]<br>2 → root() [c796f(k58), f0d30(k69), c6eaa(k83), 1c550()] |

Because the new key (k79) is not in the DSD's key range, actual split of leaf node is a non-critical write 921

Drop "stale" deferred split descriptor for which split has already occurred

Example 903

| List key to insert | k56 |
|---|---|
| Nodes read (2) | 1 → root() [c796f(k58), f0d30(k69), c6eaa(k83), 1c550()]<br>2 → c796f(k58) [k10, k21,k58] [f0d30(k69) [k63, k69]] |
| Critical write | c796f(k58) [k10, k21, k56, k58] |
| Non-critical write(s) (1) | 1 → root() [3fef9(k69) [c796f(k58),<br>...f0d30(k69)], c5ddf() [c6eaa(k83), 1c550()] |

Stale DSD was for f0d30  923

Pair of intermediate nodes (root's children) added in DSD 925

FIG. 9

Insert intermediate (non-root, non-leaf) nodes using non-critical writes

Example 1001

| List key to insert | k93 |
|---|---|
| Nodes read (2) | 1 → root() [3fef9(k69) [c796f(k58),<br>...f0d30(k69)], c5ddf() [c6eaa(k83), 1c550()]<br>2 → 1c550() [k88, k9] |
| Critical write | 1c550() [k88, k9, k93] |
| Non-critical write(s) (3) | 1 → 3fef9(k69) [c796f(k58), f0d30 (k69)]<br>2 → c5ddf() [c6eaa(k83), 1c550() ]<br>3 → root() [3fef9(k69), c5ddf()] |

Add deferred split descriptor to overloaded intermediate node

Example 1003

| List key to insert | k43 |
|---|---|
| Nodes read (3) | 1 → root [3fef9(k69), c5ddf()]<br>2 → 3fef9(k69) [c796f(k11), 61fcd(k21), 68723(k52),<br>... d2314(k58), f0d30(k63), 17f71(k69)] ]<br>3 → 68723(k52) [k22, k4, k44, k52] [d2314(k58) [k56,<br>...k58] ] |
| Critical write | 68723(k43)[ k22, k4, k43] [6960e(k52) [k44, k52] ] |
| Non-critical write(s) | 3f3f9(k69) [c796f(k11), 61fcd(k21), 68723(k52)]<br>... [ fd49d(k69) [d2314(k58), f0d30(k63),<br>...17f71(k69)] ] |

Effort-proportionality policy example: split intermediate node encountered during traversal, fix references Example 1005

| List key to insert | k17 |
|---|---|
| Nodes read (3) | 1 → root [3fef9(k69), c5ddf()]<br>2 → 3fef9(k69) [c796f(k11), 61fcd(k21), 68723(k52),<br>... [fd49d(k69) [ d2314(k58),f0d30(k63),<br>... 17f71(k69)] ]<br>3 → 61fcd(k21) [ k13, k20, k21 ] |
| Critical write | 61fcd(k21)[ k13, k17, k20, k21 ] |
| Non-critical write(s) (2) | 1 → fd49d(k69) [ d2314(k58), f0d30(k63), 17f71(k69)]<br>2 → 3fef9(k69) [c796f(k11), 61fcd(k21), 68723(k52),<br>...fd493(k69)] |

*FIG. 10*

IMMEDIATELY-CONSISTENT LOCK-FREE INDEXING FOR DISTRIBUTED APPLICATIONS

BACKGROUND

Many modern applications involve the analysis of large amounts of data. For a number of reasons including performance, availability and durability, the data may often be distributed among numerous storage servers or devices of a distributed system. In some cases a network-accessible storage service of a provider network may be employed, with the data potentially spread across multiple storage devices at one or more data centers. The particular storage server at which a data object is to be stored for a write request, or from which the data object is to retrieved for a read request, may be selected for some applications by applying a hash function to one or more keys associated with the data object. Such applications may sometimes be referred to as distributed hashing applications or distributed hash table applications.

In one variant of distributed hashing, a compound key may be employed, with one or more attribute values being used as a hash key to identify a particular subset of data, and one or more other attribute values being used as list keys or sort keys within the subset. For example, in an order management application associated with an inventory, each hash key may correspond to a different customer, while different orders submitted by a given customer may correspond to respective list keys associated with the customer's unique hash key. Common operations in such an order management application may include, for example, inserting new orders, canceling orders, retrieving data objects in list key order, and so on, which may typically require the use of some type of indexing for high performance.

Some large-scale distributed hashing-based applications may be implemented using non-relational data stores as the back-end. Such data stores may provide very high throughput rates (and low latencies) for individual reads and writes, but may not support at least some of the ACID (atomicity, consistency, isolation and durability) properties associated with the relational model. For example, some non-relational data stores may not implement consistent transactions involving multiple writes and/or may not support locking, at least in the way that relational databases usually do. Providing index-based operations that are both consistent and low-latency may present a challenge, especially in high throughput distributed hashing environments with hundreds or thousands of storage servers, and thousands of concurrent users.

BRIEF DESCRIPTION OF DRAWINGS

FIG. 6 illustrates examples of reads and writes associated with the first few entries inserted into an index, according to at least some embodiments.

FIG. 7 illustrates examples of reads and writes associated with splitting a root node of an index, according to at least some embodiments.

FIG. 8 illustrates examples of reads and writes associated with splitting a leaf node of an index, according to at least some embodiments.

FIG. 9 illustrates examples of reads and writes associated with managing a leaf node of an index when the leaf node contains a deferred split descriptor, according to at least some embodiments.

FIG. 10 illustrates examples of reads and writes associated with managing internal (non-leaf, non-root) nodes of an index, according to at least some embodiments.

Figure 1:
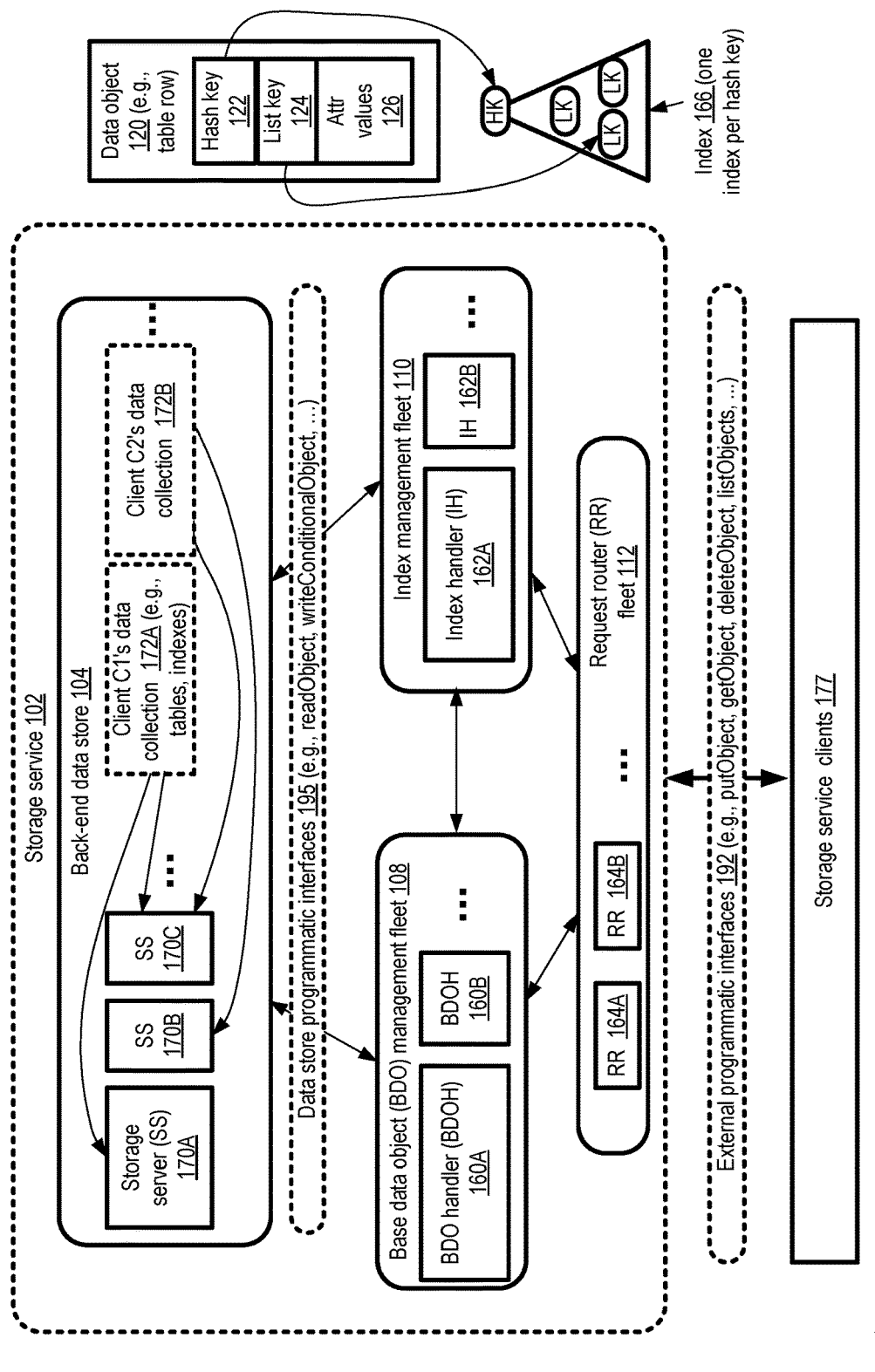
FIG. 1 illustrates an example system environment in which a lock-free indexing algorithm may be implemented for data objects comprising hash keys and list keys, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for supporting immediately-consistent lock-free indexing for distributed hashing-based applications are described. In at least some embodiments, the indexing algorithms may be implemented at a storage service of a provider network. Networks set up by an entity such as a company or a public sector organization to provide one or more network-accessible services (such as various types of cloud-based computing or storage services) accessible via the Internet and/or other networks to a distributed set of clients may be termed provider networks herein. A provider network may sometimes be referred to as a "public cloud" environment. The resources of a provider network may in some cases be distributed across multiple data centers, which in turn may be distributed among numerous cities, states and countries. In other embodiments, the indexing techniques may be implemented at computing devices which are not necessarily associated with, or part of, a network-accessible service or a provider network.

The lock-free indexing algorithm may be employed for data objects which are identified by a combination of a hash key and a list key in at least some embodiments. For example, in a distributed order management system for an Internet-based retailer, a unique hash key may be generated for each customer, and each order generated for a given customer may be assigned its own list key (e.g., unique at least within the scope of the customer's order set). According to at least one embodiment, a respective tree-based or tree-structured index (e.g., based on a variant of a B-tree or B+-tree) may be generated for each hash key. A leaf node of the index may comprise respective entries for some number of list keys (and in some cases, deferred split descriptors as discussed below), while non-leaf nodes may comprise pointers or references to their child nodes (and also in some cases, deferred split descriptors). Such tree-based indexes may be referred to herein as list key indexes. In some embodiments, the entries within a leaf node may be arranged in a selected sort order (such as dictionary order) with respect to the list keys.

Each node of the index may be persisted at one or more storage servers of a data store (e.g., a non-relational key-value based database system which may not natively support locking or transactions) in at least some embodiments. In addition to accommodating the index nodes, the data store may also serve as the persistent repository of the content of data objects which are being indexed (e.g., the details of various customer orders in the above example). In at least some embodiments, the back-end data store may support conditional write operations. With respect to the algorithms discussed herein, a conditional write may be defined as a write that succeeds only if one or more attributes of the object being written meet respective expected conditions at the time that the write is attempted. For example, a conditional write to update a value of an attribute Attr1 of a data object Obj1 may indicate an expected pre-write value of Attr1, with the write being expressed as the logical equivalent of "If the current value of Obj1.Attr1 with key K1 is 10, set Obj1.Attr1 to 20". In this example, if Obj1.Attr1 's value is not 10, the conditional write may be designated as having failed due to a violation of an expected condition. Another example of a conditional write may be expressed as the logical equivalent of "create object Obj2 with key value K2 if an object with that key doesn't already exist", which may be used for generating new objects. Conditional writes may also be considered analogous to "compare and swap" operations at a data object level. In at least some embodiments, the state of the object to be modified may be read, and the condition that has to be met for the conditional write may be that the object's state has not changed since the object was read.

The indexing algorithm may comprise a plurality of index operation handlers in various embodiments, collectively responsible for handling insert updates, deletes, read queries, and the like from a potentially large set of clients concurrently. Each index operation handler may for example comprise one or more threads of execution at one or more computing devices in some implementations. Index operation handlers may also be referred to herein simply as index handlers.

The index handlers may defer at least some split operations (as well as other types of operations under certain conditions) to ensure immediate consistency without using locks, while also reducing insert latency in various embodiments. To defer a split of an index node, a "deferred split descriptor" containing an identifier of a to-be-split node and one or more key entries that may be included in the to-be-split node may be embedded within an existing node of the index, and the existing node may be written to the data store as described below. The "actual" split of the node may be performed in a separate write operation later (which may sometimes be performed by a different index handler than the one which embedded the deferred split descriptor). A deferred split descriptor may also be referred to as an embedded node. The new node written to the data store based on the contents of a deferred split descriptor may be referred to as a "split-result" node herein.

In one embodiment, when a request to insert an entry corresponding to a particular list key LK1 (and a hash key HK1) is received, an index operation handler selected to perform the insert may first identify the particular tree-structured index corresponding to HK1 (assuming such an index already exists), and fetch the root node of that index. Then, a path down the tree to a candidate destination node CN1 for the LK1 entry may be identified. During the traversal of the tree, in some embodiments the index handler may keep track of deferred write operations that may be performed after the primary task of inserting LK1's entry is completed. Such deferred operations, as will become clearer with the help of examples provided below, may include implementing split operations deferred earlier, adjusting child node reference or pointer-related entries at various index nodes, and so on.

In some embodiments, respective split criteria (e.g., the maximum sizes of the index nodes, or the maximum number of keys for which entries can be accommodated at a given node) may be defined for respective levels or depths within the tree-based index: e.g., a root node may meet its split criterion when it has reached R entries, a leaf node may meet its split criterion when it has reached F entries, and a non-leaf, non-root mode at depth D within the tree may meet its split criterion when it has reached M entries, etc. The split criteria for the various levels may be selected in different embodiments, for example, based on parameters such as the average size of packets transmitted between the index handlers and the storage service versus the average sizes of the keys, etc. In some embodiments all the nodes may have the same split criterion, regardless of the particular depth (distance from the root) of a node within the tree. In at least one embodiment, split criteria may be defined at least partly in terms of node "heat"—e.g., the number or rate of recent writes to the node. In one implementation, for example, timestamps corresponding to the N most recent writes to a given node may be stored in the node, and the node may be deemed to have met its split criterion if the number of writes to it within a specified period T exceed a threshold. Using the heat-based approach may result in better workload distribution at the storage servers at which the index nodes are stored. A combination of factors may contribute to split criteria in some embodiments—e.g., a compound metric based on the number of keys currently in a node, the total size of the entries in the node, and/or timing or "heat" information may be compared to a threshold to determine whether a node should be split.

After the candidate destination node CN1 is reached, the index handler may determine the contents of a critical write which has to be performed before an insert-completed response (indicating the success of the index insert for LK) can be provided. The contents of the critical write may differ, depending on various factors such as (a) whether CN1 already contains one or more embedded deferred split descriptors, (b) whether LK1 falls within the key range of an embedded deferred split descriptor currently in CN1 and/or (c) whether adding LK1's entry would lead CN1 to meeting its split criterion.

In one straightforward scenario, CN1 may not contain a deferred split descriptor (generated as a result of an earlier insert for a different key) and adding a new entry (for LK1) to CN1 would not lead to a split criterion for CN1 being met. In this scenario, the critical write would comprise adding LK's entry and writing the modified CN1 to the data store using a conditional write (with the expected condition being that CN1 has not been modified since it was read by the index handler responsible for inserting LK1's entry).

In another scenario, CN1 may not contain a deferred split descriptor, but adding LK1's entry may lead CN1 to meet its split criterion. In this case, one or more deferred split descriptors may be embedded within CN1 (depending on CN1's depth within the tree as discussed below). A given deferred split descriptor may include, in at least some embodiments, a new node identifier generated or determined by the index handler for a to-be-split node, and one or more pre-existing list key entries of CN1 (and in some cases the entry for LK1). The critical write in this scenario would comprise the modified version of CN1 with the embedded deferred split descriptor(s), and would once again be attempted using the conditional write feature of the back-end data store.

In a third scenario, CN1 may already contain one or more deferred split descriptors. If LK1 falls within the key range of a deferred split descriptor DSD1, the critical write may comprise writing the node identified in DSD1 (with LK1's entry added) to the back-end data store via a conditional write. If LK1 falls outside the key range of any DSD, the critical write may comprise adding LK1's entry to the set of entries of CN1 and writing the modified CN1 node via a conditional write.

If the conditional write request corresponding to the critical write (whatever the contents of the critical write happen to be) succeeds, in various embodiments an insert-completed response may be provided without waiting for any other operations to be completed. No locks may be acquired for the critical write or for any other write in at least some embodiments. Even when the result of adding the LK1 entry results in a split criterion being met, the actual split may not be performed before the insert-completed response is generated in at least some embodiments. Instead, in such embodiments, while the identifier of the new to-be-split node may be generated and stored within a DSD in the modified version of the candidate node, the write of the to-be-split node may be deferred until later (e.g., until another index handler or the same index handler encounters the deferred split descriptor while processing some other index operation request). If the conditional write operation fails, in some embodiments a failure indication may be provided instead of the insert-completed indication.

In addition to the critical write corresponding to the insert of LK1, in at least some embodiments the index handler may also have identified zero or more deferred write operations to perform during its traversal of the tree. Such deferred writes may be designated as non-critical writes (with respect to completing LK1's insertion) and may, for example, involve performing an actual split corresponding to a deferred split descriptor stored earlier, correcting child node references and so on. A non-critical write may be directed to a node other than the node written as part of the critical write—that is, the same node may not be updated twice in response to a given insert request in at least some embodiments. Non-critical writes may be referred to as "fix-up" operations for the index or tree in some embodiments. In one embodiment, the tree-structured data structure used for the index may be referred to as a "fix-up" tree. Depending on the number of deferred or non-critical operations identified, the index handler may issue zero or more conditional-write requests corresponding to individual non-critical writes. In some implementations, a given index handler may comprise multiple threads of execution, with one thread issuing the conditional write request for the critical write, and other threads issuing conditional write requests for non-critical writes. The failure of a non-critical write may result in no further action by the index handler in at least some embodiment, under the general assumption that such a failed non-critical write would be recognized as part of a subsequent traversal of the index for some other index operation. In some embodiments as discussed below, a proportional-effort policy may be implemented by the index handler fleet. According to such a policy, the amount of work (e.g., the total number of conditional writes) performed for a given insert request should in general be kept as close as possible to the average amount of work performed for all inserts. Thus for example, if on average between one and two non-critical writes (and one critical write) are performed for a given insert request, then an index handler should typically avoid scheduling more than two non-critical writes regardless of the number of deferred operations it identifies during the index traversal, and the index handler should typically schedule at least one non-critical write (if it encounters non-critical writes).

According to the approach discussed above, at least in some embodiments it may often be the case that a deferred split descriptor is generated and stored by one index handler (in response to one insert request), while the write resulting in the persistence of the new node indicated in the split descriptor to the data store is performed by a different index handler (e.g., during the processing of a different insert request). Before an insert-completed response is provided for a list key, a critical write containing the entry for the list key may have to be successfully completed as described. Consequently, even though the tree being used for the index may not necessarily be perfectly balanced at some points in time due to the presence of deferred split descriptors, and even though some child pointers/references of the index may be temporarily inaccurate, the index may support immediate consistency. That is, at any point in time after an insert corresponding to a given list key succeeds, a persistent version of the node containing the entry for that list key may be retrieved reliably (using the combination of the hash and list keys) from the back-end data store in various embodiments. In at least some embodiments, a write to the back-end data store may not be considered successful until multiple replicas of the object being written have been replicated at respective storage servers (for example, to one "master" storage server for the object and one or more non-master storage servers).

In some embodiments, variations of the basic scheme outlined above may be used. For example, the underlying data (e.g., the order details in the order management example) for which the index is created may be stored within the index nodes themselves in some embodiments—that is, an entry for a list key LK1 may include the content of the record identified by LK1. In at least one embodiment, the algorithm may be used for indexes that are implemented entirely within volatile or main memory—e.g., persistent disk-based storage devices may not be employed.

As in other types of indexing algorithms, the list key index for a given hash key may be structured in such a way that responding to a range query based on list keys is very efficient. For example, in the order management example, a response to a query logically equivalent to "list orders submitted by customer C1 within order identifier range [OIDp-OIDq]" may be generated by (a) identifying the particular list key index corresponding to customer C1, (b) navigating the index down to the leaf node LN1 containing an entry for OIDp and (c) reading, using the entries contained in LN1 and zero or more successor leaf nodes, order records corresponding to the entries for OIDp-OIDq. In at least one embodiment, requests to delete a list key entry may be implemented by simply zeroing out the entry contents, instead of actually deleting the entry from the index.

Example System Environment

FIG. 1 illustrates an example system environment in which a lock-free indexing algorithm may be implemented for data objects comprising hash keys and list keys, according to at least some embodiments. As shown, system 100 comprises several different distributed components of a network-accessible storage service 102. In some embodiments the storage service 102 may be implemented using the resources of a provider network or public cloud environment. The storage service 102 may be used to store a variety of data object types, including at least some data objects 120 which are each identified by a compound key. The compound key for a given data object 120 may comprise a hash key 122 and a list key 124 in the depicted embodiment. A given data object 120 may include respective values 126 for a number of non-key attributes or columns. In at least some embodiments different data objects may comprise values for different combinations of attributes—that is, not all data objects 120 may conform to a common schema, although each data object may include a hash key and a list key. A hash key and/or a list key may each be formed using a combination of attributes or columns in some embodiments.

The storage service 102 may comprise a request router (RR) fleet 112, a base data object (BDO) management fleet 108, an index handler fleet 110, and one or more back-end data stores 104 in the depicted embodiment. The RR fleet 112 may receive requests from clients 177 of the storage service via a client-facing or external set of programmatic interfaces 192 in the depicted embodiment. A number of different types of programmatic interfaces may be supported in different embodiments, including for example a set of application programming interfaces or APIs, a web-based console, command-line tools, or graphical user interfaces. In some embodiments, the clients 177 of the storage service 102 may themselves include components of one or more network-accessible services—e.g., a service which is used to manage retail sales of an Internet retailer may represent a client of the storage service, and may utilize the storage service for an order management application. The external programmatic interfaces may support operations such as "putObject" (to create or update a data object, e.g., identified by a key), "getObject" (to read a data object), "listObjects" (to retrieve objects with specified keys or attributes) or "deleteObject" (to delete an object).

The request routers 164 of fleet 112 (e.g., request router 164A or 164B) may be responsible for receiving client requests via the programmatic interfaces and forwarding the requests (or internal representations of the requests) to the appropriate components of storage service 102. Some data object collections (e.g., tables or buckets) of the storage service may have indexes created for them, while others may not. The underlying objects for which an index is created may be referred to as "base" data objects herein. For example, in some embodiments in which the data model of storage service 102 comprises non-relational database tables, the tables and their rows may be considered base data objects for which one or more types of indexes may be constructed. A given client request may result in some number of operations directed to base data objects and some number of operations directed to indexes in the depicted embodiment. The base data object handlers 160 of BDO fleet 108, such as BDOH 160A or 160B, may be responsible for implementing the subset of operations which do not involve indexes per se, while the index handlers 162 (e.g., 162A or 162B) of fleet 110 may implement index related operations. It is noted that in some embodiments, operations associated with indexes as well as base data objects may be performed by the same components of a storage service 102—that is, the responsibilities for index operations and base table records may be shared by a common fleet of data object request handlers. In at least some embodiments, the BDO fleet 108 may issue index-related requests to the index handler fleet 110.

The back-end data store may comprise a plurality of storage servers 170, such as 170A, 170B and 170C, organized in a multi-tenant manner in the depicted embodiment. That is, data objects (including portions of base data objects and/or indexes) of more than one client may be stored at a given storage server. For example, client C1's data object collection 172A, comprising some number of tables and indexes, may be distributed among at least storage servers 170A and 170C, while the data object collection 172B of a different client C2 may be distributed among at least storage servers 170A and 170B. Any of a variety of partitioning strategies may be employed in different embodiments to spread the data (and hence the storage-related workload) for a given data object collection among multiple storage servers. In at least some embodiments, a replication strategy may be employed to achieve the desired levels of data durability and availability. In one implementation, for example, a master storage server and some number of non-master storage servers may be identified for a given set of data objects, and each object may be replicated at the master and the non-master for availability and durability. The back-end data store 104 may be accessed via a set of internal programmatic interfaces 195 in the depicted embodiment. In some embodiments, the programmatic interfaces 195 may also be exposed to at least some external clients. In at least some embodiments, the back-end data store may not support atomic transactions that comprise more than one write operation. In various embodiments, conditional write operations (e.g., via a writeConditionalObject API) may be supported by the back-end data store.

Balanced-tree-based indexes 166 may be employed to enable fast responses to common list-key based queries in the depicted embodiment for data objects 120. For a given hash key (HK), data objects with numerous different list key (LK) values may be managed at the storage system 102. In some cases, tens of thousands of list keys may be generated for respective objects corresponding to a given hash key. One index 166 may be created per hash key in the depicted embodiment. Each index 166 may comprise a root node and zero or more non-root nodes. Each node of an index may be assigned a unique node identifier (unique at least within the index). A node may comprise a number of entries corresponding to respective list key values within a range of list key values associated with the node, as well as information about actual or potential child nodes (child nodes whose split from the current node has not yet been performed) as discussed below. The node identifier may be used to identify the particular storage server 170 at which the node contents are stored at the back-end data store. Within a given index node, the list key entries may be stored in sorted order (e.g., in dictionary order in one implementation in which strings are used for the list keys) in some embodiments within an index node. The contents of a given list key entry may vary in different embodiments. For example, in one embodiment the list key entry may contain a pointer to the corresponding base data object at a storage node. In another embodiment, at least a portion of the base data object may be stored as part of the list key entry within the index itself.

A scalable lock-free algorithm for updating indexes 166, while providing immediate consistency (as opposed to the eventual consistency which may be supported in some storage environments) may be implemented in the depicted embodiment. According to the algorithm, in response to determining that an entry for a given list key (with an associated hash key) is to be inserted into an index, an index handler 162 may first identify the particular tree-based index 166 corresponding to the hash key. Then, based on the child node references (or list key contents) contained in the index nodes starting from the root node, a path to a candidate destination node for the new list key's entry may be identified and traversed. Depending on the current contents of the candidate destination node and the value of the to-be-inserted list key, the index handler may identify the contents of a critical write operation which must be completed before the insertion can be considered complete. In addition, one or more non-critical writes may also be identified; these writes may be performed asynchronously with respect to the critical write, or may even be deferred and left to other index handlers.

If the addition of the new entry to the candidate destination node would result in a split criterion being met (where the split criteria may differ for different levels or node depths within the index), one or more deferred split descriptors may be generated in some embodiments. The number of deferred split descriptors may also differ depending on the depth of the candidate destination node within the index in some embodiments—e.g., in the case of a root node, two deferred split descriptors may be generated, while in the case of a non-root node, only one deferred split descriptor may be created. A given deferred split descriptor may include a newly-created node identifier and a group of one or more list key entries which are to be included in a to-be-split node. The deferred split descriptor may be embedded within the candidate destination node, and the modified version of the candidate destination node may be written back to the data store as the critical write. The new list key may, depending on its value, either fall within the range of list keys associated with the to-be-split node, or may be included in the range of list keys which are going to remain with the candidate destination node after the deferred split is actually performed. The actual split operation resulting in the creation of a new node with the node identifier indicated in the deferred split descriptor may eventually be performed, e.g., as a critical or non-critical write associated with some other index update operation, later by the same index handler or a different index handler. Thus, even though the split criterion for a node may be met as a result of the insert, the actual split may be deferred till later in at least some embodiments. Of course, if a split criterion would not be met as a result of adding the entry for the new list key, a modified version of the candidate destination node with the new list key added may form the critical write. No locks may be acquired for either the critical write or any of the non-critical (deferred) writes performed by an index handler in various embodiments. In some embodiments, the back-end data store may not even support write locks of the kind typically supported by relational databases.

The insert may be deemed successful (and a corresponding insert-completed response may be provided to the requesting client) as soon as the critical write of the candidate destination node is completed (e.g., as a result of a conditional write request issued by the index handler to the back-end data store). The index may be deemed immediately consistent because at any given time, for any given list key for which a corresponding base data object has been stored, exactly one node containing the entry for the key may be found at the back-end data store. Examples of various operations at the root node, leaf nodes and intermediate (non-leaf and non-root node) are provided below to provide insights into various aspects of the index management algorithm. It is noted that although the index management algorithms are described primarily in the context of data objects which are identified using a compound key (with a hash key and a list key) in the remainder of this document, the algorithms may be employed with equal success in embodiments in which other types of keys, which do not necessarily have distinct hash and list key components, are used.

Order Management Example

Figure 2:
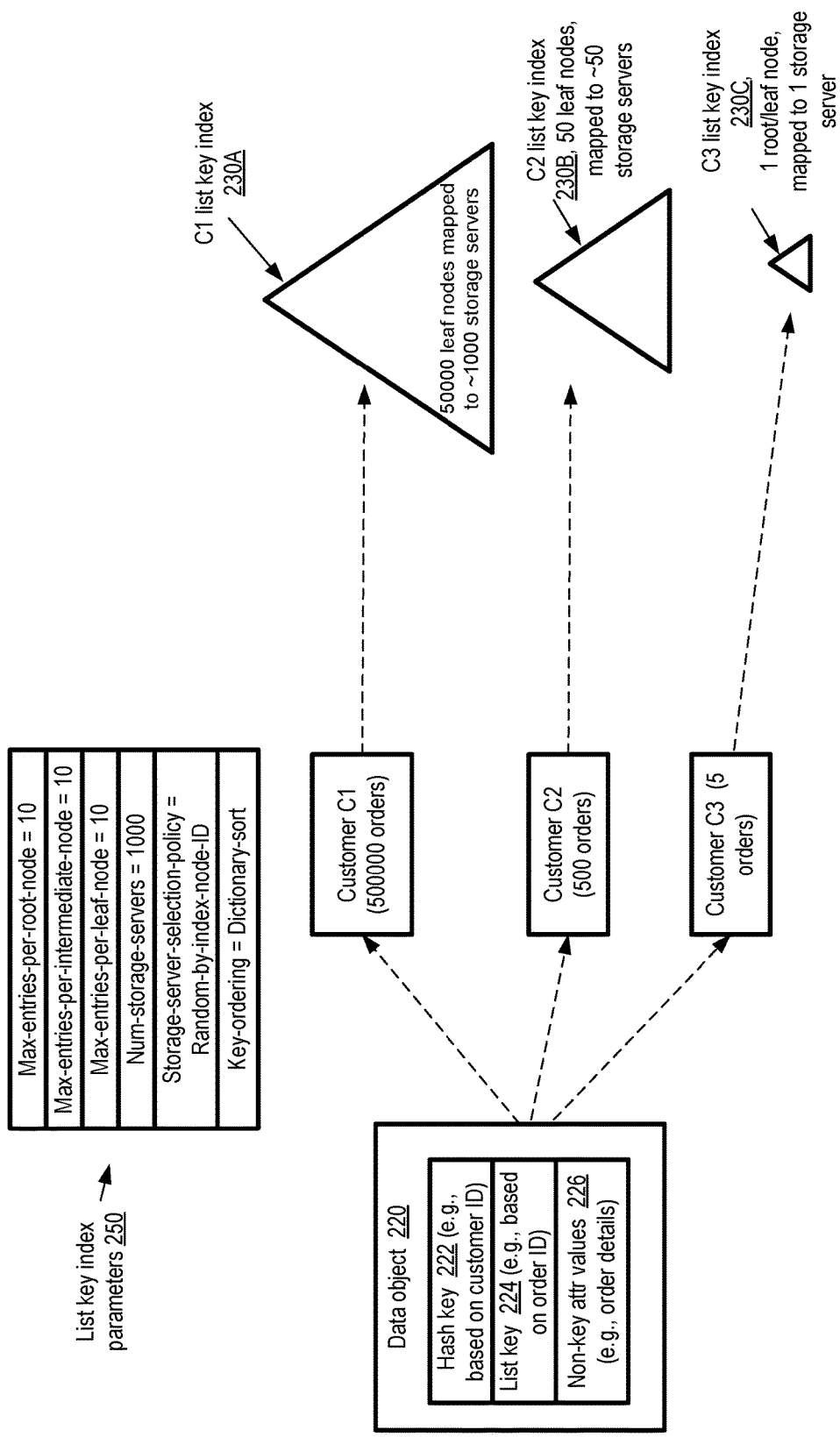
FIG. 2 illustrates example parameters which may be selected for a lock-free tree-based indexing algorithm, and an example use case for the algorithm, according to at least some embodiments.

FIG. 2 illustrates example parameters which may be selected for a lock-free tree-based indexing algorithm, and an example use case for the algorithm, according to at least some embodiments. The use case corresponds to an order management application associated, for example, with an Internet-based supplier of products. The hash key 222 of a data object 220 corresponds to a unique customer identifier. Each customer may, at any given point in time, have generated multiple distinct orders for one or more of the supplier's products; each such order may be associated with a respective distinct list key 226. The details of the orders (e.g., the product ordered, the count or size of the products, the time of the order, etc.) may be represented as values of non-key attributes 226. The total number of orders generated by a given customer may vary widely. For example, customer C1 may have 500000 orders at a given point in time, customer C2 may have 500 orders and customer C3 may have just five orders.

The supplier on whose behalf the order management application is run may be responsible for providing fast and consistent responses to requests logically equivalent to the following (among others): "cancel order O1 of customer C1", "list all orders of customer C1", "add an order from customer C1 for product P1", and so on. If the indexes used for managing the order information are temporarily inconsistent with the underlying base data (as may be the case if an "eventually consistent" approach is adopted), the responses to some queries may be incorrect. For example, if a cancellation of an order is followed immediately by a query to provide a list of all current orders, the list of orders may not necessarily reflect the cancellation. Similarly, if a request to add an order is immediately followed by a similar listing query, the list may not necessarily reflect the added order.

Accordingly, the immediately-consistent indexing algorithm described above may be employed for list key indexing in the depicted embodiment. In various embodiments, the set of parameters 250 used for the list key indexes may include the maximum number of index entries per node at different levels or depths within the tree used for the index, which correspond to the split criteria used for index nodes. In some embodiments, the maximum number of entries allowed may differ based on the depth of the node—e.g., parameters max-entries-per-root-node, max-entries-per-intermediate-node (where an intermediate node is one that is neither a root node nor a leaf node), and max-entries-per-leaf-node may differ from one another. As mentioned earlier, in some embodiments, split criteria may be defined at least partly in terms of node "heat" (e.g., the rate of recent writes to the node) or aggregated key entry size, rather than simply in terms of the number of entries as in FIG. 2. Heat-based split criteria may also vary with node depth in one embodiment—e.g., nodes nearer the root (which are accessed more frequently) may be split at lower heat thresholds than nodes further from the root. Depending on the metrics and thresholds to be used for determining when a split should be performed, additional parameters may be defined in various embodiments, beyond those shown in FIG. 2. In some embodiments, the parameters may include one or more functions to be used to determine whether a split criterion has been met for a given tree depth, based on some combination of metrics of key count, key size and/or heat. The total number of storage servers to be used for the list key index nodes may be governed by the num-storage-servers parameter. The manner in which the particular storage server to be used to store a given node is to be selected may be indicated by storage-server-selection-policy parameter—e.g., a randomizing hash-based function applied to the node identifier may be used to select the storage server. The order in which list keys are to be ordered or arranged within the index nodes may be governed by the key-ordering parameter. For example, if strings are used for the list keys, dictionary sort may be used to arrange the key entries in some embodiments.

An indication of the relative sizes of the list key indexes created for customers C1, C2 and C3 is provided in FIG. 2. C1's list key index 230A may have approximately 50000 leaf nodes, because there are 500000 orders and max-entries-per-leaf-node is set to 10. The 50000 leaf nodes may be randomly distributed among all 1000 storage servers available. C2's list key index 230B may comprise 50 leaf nodes (since there are 500 orders) and may be mapped to approximately 50 storage servers. Since C3 has only 5 orders, C3's list key index may only comprise a single node (since the root node itself can contain up to 10 entries), mapped to a single randomly selected storage server. In some embodiments, a respective file may be used to store the contents of each node of a list key index at the back-end data store.

Methods for Inserting List Key Entries

Figure 3:
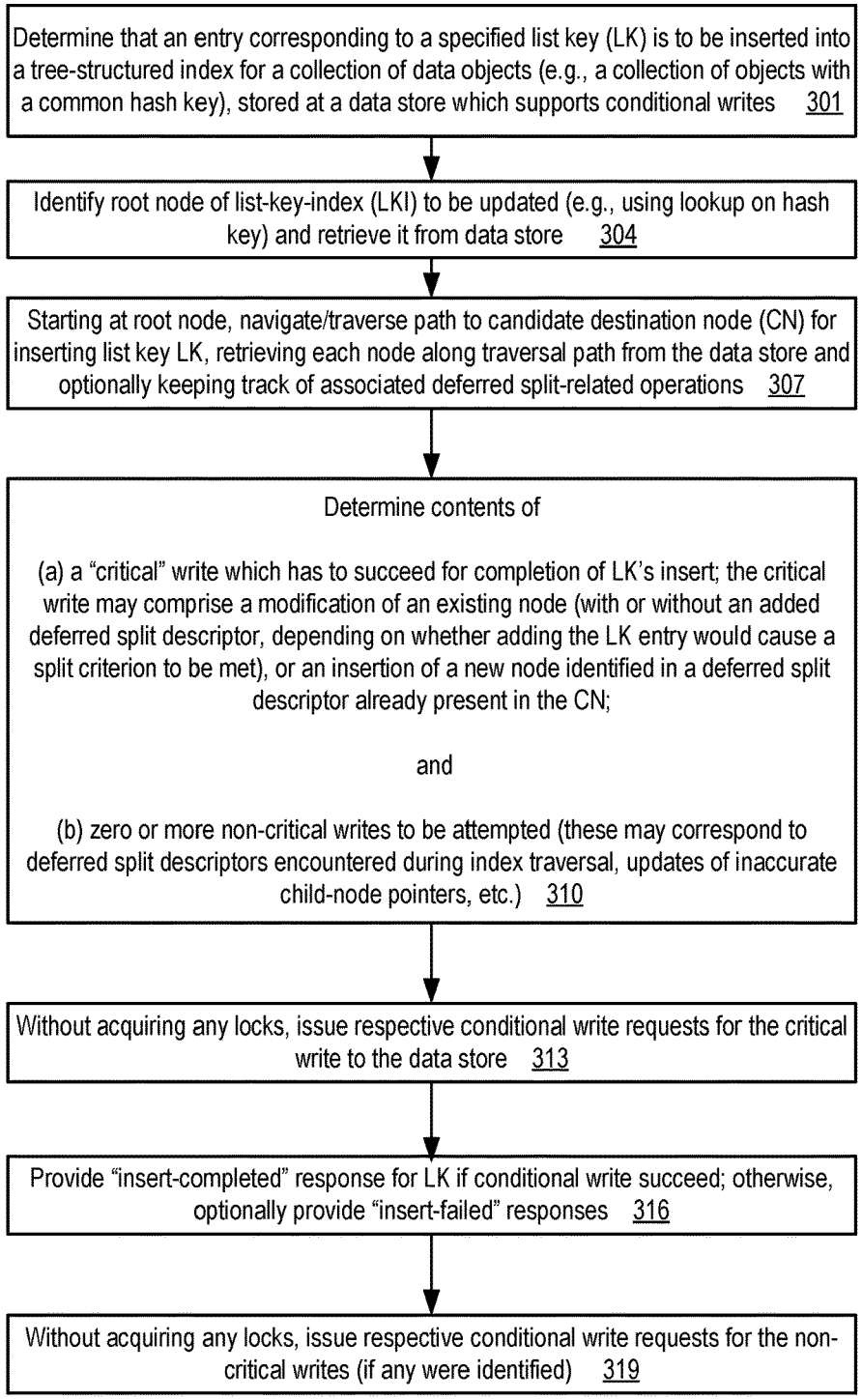
FIG. 3 is a flow diagram illustrating aspects of operations that may be performed to insert an index item according to a lock-free indexing algorithm in which split-related operations may be deferred, according to at least some embodiments.

FIG. 3 is a flow diagram illustrating aspects of operations that may be performed to insert an index item according to a lock-free indexing algorithm in which split-related operations may be deferred, according to at least some embodiments. As shown in element 301, a determination may be made (e.g., by an index handler of a storage service in response to a client-generated request) that an index entry corresponding to a list key LK is to be inserted into a tree-based index set up for a collection of data objects (e.g., the collection of data objects associated with a single hash key). The nodes of the index, as well as the data objects, may be stored at a back-end data store which supports conditional writes in the depicted embodiment. The root node of the list key index (LKI) to be updated may be identified (e.g., based on a lookup via the common hash key for the collection of data objects) and retrieved from a back-end data store (element 304).

Starting at the root node, the tree may be traversed to a candidate destination node (CN) for the insertion of LK's entry (element 307). Each node along the path may be retrieved from the data store in at least some implementations. In some embodiments, the index handler responsible for the insertion may record one or more opportunities for deferred operations as it traverses the index, such as deferred splits of nodes, correcting child node references, and the like.

Once the candidate destination node CN is reached, the index handler may determine the contents of a critical write and zero or more non-critical writes that the index handler will initiate (element 310). Depending on the state of CN (e.g., how close CN is to its maximum capacity for entries, whether CN already has a deferred split descriptor embedded in it, etc.) and where LK lies among the range of values of list keys associated with CN, the critical write may either involve the update of CN, or the write of a new node (split from CN) to the back-end data store. Examples of different possible critical writes which may be performed for an insert in various embodiment are discussed in the context of FIG. 4. The non-critical writes may comprise operations identified during the traversal to CN, or may be side effects of the critical write itself (e.g., a parent node's child reference, which may contain a key range for the child node in the depicted embodiment, may be updated due to the insertion of LK's entry).

A conditional write request for the critical write may be transmitted to the back-end data store (element 313) without acquiring any locks in the depicted embodiment. If the critical write succeeds, an insert-completed response may be provided to the source of the insert request (element 316). If the critical write fails, in some embodiments a corresponding insert-failed response may be provided instead. If one or more non-critical writes were identified, they may also be initiated using respective conditional write requests in at least some embodiments (element 319).

Figure 4:
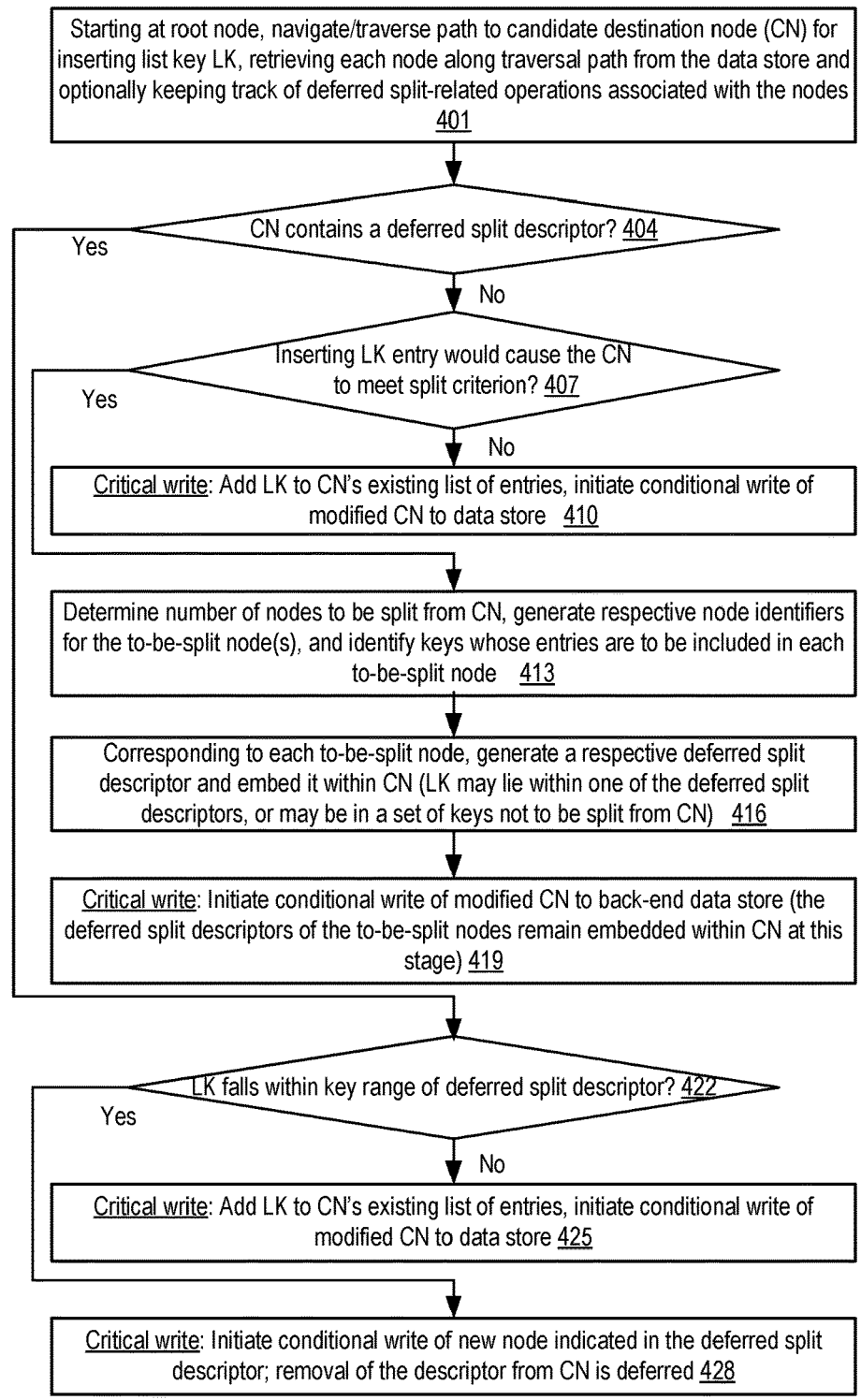
FIG. 4 is a flow diagram illustrating aspects of operations that may be performed to implement critical writes associated with inserting an index entry, according to at least some embodiments.

FIG. 4 is a flow diagram illustrating aspects of operations that may be performed to implement critical writes associated with inserting an index entry, according to at least some embodiments. As shown in element 401, the tree used for the index may be traversed starting from the root node along a path to a candidate destination node CN for the to-be-inserted list key LK, with each non-root node being identified using child node references. During the traversal, the index handler responsible for the insert may keep track of deferred split related operations associated with the nodes encountered—e.g., some nodes may have deferred split descriptors in them, others may have not-fully-accurate child node references, and so on.

When the candidate destination node CN (which may in some cases be the root node itself) is reached, the index handler may determine whether CN already has a deferred split descriptor (DSD) (element 404). If CN does not contain a DSD, and adding LK's entry would not cause CN to meet its split criterion (as determined in operations corresponding to element 407), a modified version of CN that includes a new entry for LK may be created. A conditional write may be initiated to store this modified version of CN to the back-end data store (element 410); the critical write in this scenario may comprise the write of this modified version of CN.

If the addition of LK's entry would cause CN to meet its split criterion (which may depend on the depth of CN within the tree as discussed earlier), as also determined in operations corresponding to element 407, the index handler may have to prepare one or more deferred split descriptors and embed them into CN, and then store the modified version of CN containing the deferred split descriptor(s) to the back-end data store as the critical write. As indicated in element 413, the number of new nodes to (eventually) be split from CN may be determined, e.g., based on whether CN is the root node (in which case two nodes may be split from CN) or not (in which case one node may be split). A respective node identifier may be generated for each to-be-split node, and the set of keys for which entries are to be included in each to-be-split node may be identified. A respective deferred split descriptor corresponding to each to-be-split node may be included or embedded in a modified version of CN (element 416). Each DSD may include the identifier generated for the to-be-split node, as well as the keys whose entries are to be included in the to-be-split node. The entry for LK itself may be included in a DSD if it lies within the range associated with the DSD; otherwise, if LK is outside the range of keys of any of the DSDs, it may be added to CN's set of key entries. After the DSD or DSDs have been embedded into CN, the critical write of the modified version of CN may be initiated to the back-end data store (element 419), e.g., using a conditional write primitive supported by the back-end data store.

If CN does contain at least one embedded DSD (as determined in operations corresponding to element 404), this means that CN has already met its split criterion prior to the current insert operation. The contents of the critical write may then depend on whether LK lies within the range of keys of an embedded DSD, or not.

If LK lies within the range of an embedded DSD (as detected in operations corresponding to element 422), the critical write may comprise the write of the to-be-split node indicated in the DSD (element 428). That is, the split that was deferred earlier may constitute the critical write. The node that is written to the data store, with an identifier and a set of contents based on the DSD, may be referred to as the split-result node. Even though the node indicated in the DSD is written to the back-end data store as part of the insert processing, the DSD itself may remain embedded in CN in at least some embodiments; the removal of the DSD may be deferred (e.g., at least until after the split-result node is written out to the back-end data store as the critical write).

If LK lies outside the range of an embedded DSD (as also detected in operations corresponding to element 422), LK's entry may simply be added to CN in at least some embodiments, leaving the DSD unchanged. The critical write may then comprise the write of the modified CN with the LK entry added (element 425). In this scenario, CN may grow despite the presence of the DSD. As such, buffer space sufficient to store at least one key entry after a node such as CN meets its split criterion (and after a DSD is embedded in the node) may be retained at each node in at least some embodiments. The write of the to-be-split node indicated in the DSD may be attempted as a non-critical write after the critical write of element 425 is attempted.

It is noted that at least in some embodiments, exactly one critical write (corresponding to one node of the index) may need to be performed to complete an insert of a list key's entry. In some embodiments, if a conditional write request corresponding to the critical write fails due to the fact that an entry with the same node identifier has been modified since it was read, at least some of the other non-critical writes may still be attempted by the index handler using respective conditional writes. In one embodiment, if the index handler determines that it is going to attempt multiple non-critical writes the index handler may issue respective conditional write requests for each of the multiple non-critical writes regardless of the success or failure of any of the non-critical writes. In other embodiments, a failure of one of the write requests issued (e.g., either the critical write or a non-critical write) may cause the index handler to avoid issuing any additional write requests. In at least some embodiments, the approach taken with respect to non-critical writes in the indexing algorithm is that because (a) such writes are not essential for maintaining immediate consistency and (b) such writes would be identified and acted on by other index handlers (or the same index handler which attempted them in the first place) later, the failure of a non-critical write may be ignored. A number of simplified concrete examples of critical and non-critical writes attempted as a result of insert requests are provided below.

Index Node Descriptor Notation

Figure 5:
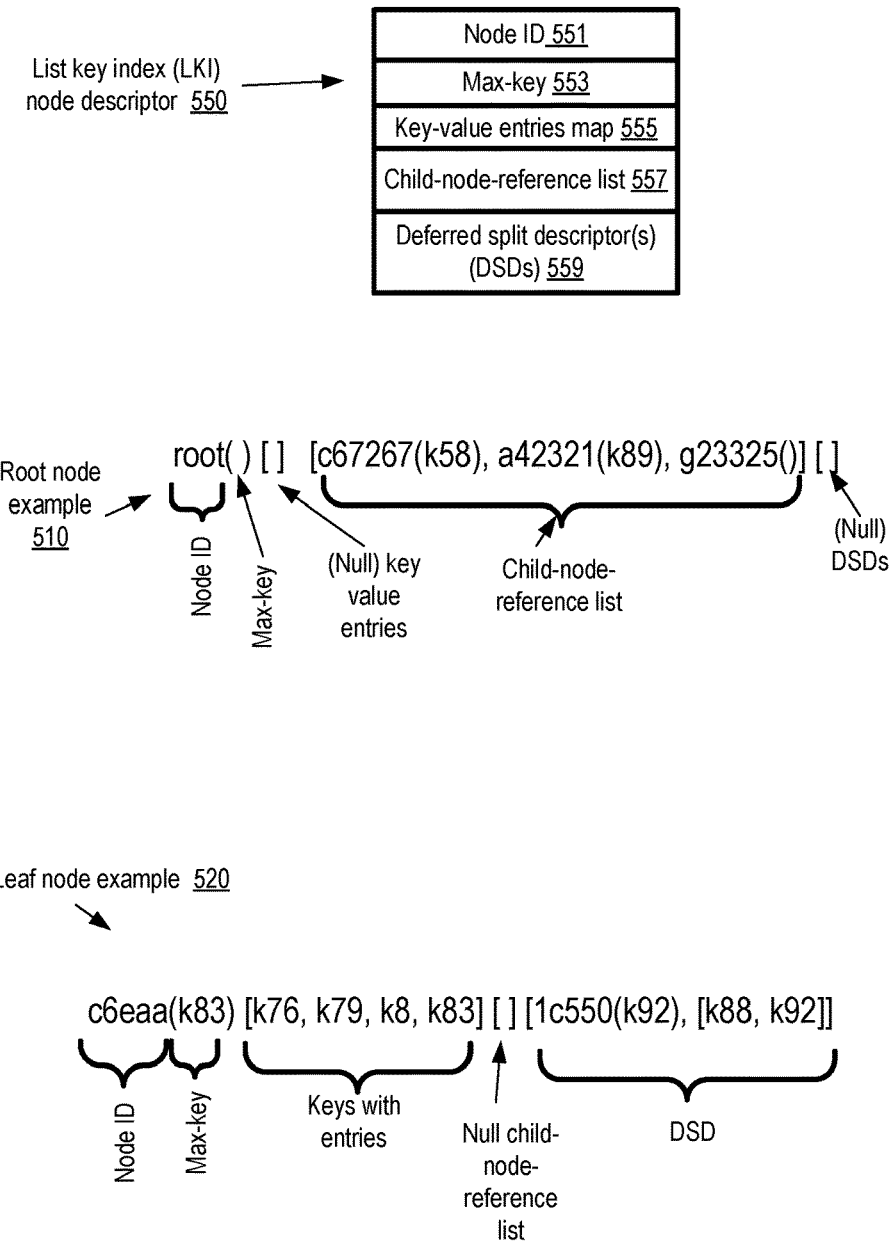
FIG. 5 illustrates example elements of an index node descriptor, according to at least some embodiments.

FIG. 5 illustrates example elements of an index node descriptor, according to at least some embodiments. As shown, a node descriptor 550 for a given list key index node may comprise a unique node identifier 551, a max-key field 553 indicating the maximum list key value for which a list key entry or child reference is stored in the node, a set of list key entries 555 (which may be implemented as a map of keys to values), a child-node-reference list 557 and/or one or more deferred split descriptors 559. A deferred split descriptor itself may comprise a node identifier of a to-be-split node, the to-be-split node's max-key field, and the set of list key entries of the to-be-split node—that is, in the depicted embodiment a DSD may contain all the elements of any other node except another DSD. The node identifier 551 and/or the list keys themselves may be expressed using strings in some embodiments; in other embodiments, numeric values rather than strings may be used. The list keys of a given node (i.e., the list keys for which entries are stored in the node) may be stored and/or shown in accordance with a selected sort order in various embodiments. In the examples shown in FIG. 5 onwards, string-valued list keys may be presented in dictionary order for various nodes.

FIG. 5 includes a root node example 510 and a leaf node example 520 to illustrate the format in which node descriptors will be represented in FIG. 6-FIG. 10. The identifier of the root node is the string "root". As the root node, by definition, stores entries or child references for all the nodes of the index, its max-key value is always infinite. (The term "infinite" is used as a substitute for the maximum permitted key; in practice, of course, a key value cannot be infinite and is limited by the constraints of the hardware or software being used.) The infinite value is represented by a null or empty value in the round brackets "( )" after the string "root". The root node 510 as shown in FIG. 5 comprises no key entries of its own, as indicated by the empty square brackets "[ ]" after the max-key entry. In its depicted state, root node 510 comprises references to three child nodes, which are each represented by their respective node identifiers and max-key values. The three child nodes of root node 510 have node identifiers c67267, a42321, and g23325 respectively and max key-values k58, k89 and infinity respectively. The root node 510 does not have any deferred split descriptors, as indicated by the empty square brackets at the end of the descriptor.

The example leaf node 520 has the node identifier "c6eaa" and currently has entries for a maximum list key k83. The string [k76, k79, k8, k83] indicates that the leaf node stores key entries for four keys: k76, k79, k8 and k83 (in dictionary order). There are no child node references (as indicated by the empty square brackets following the key list, but there is a deferred split descriptor for a node which will eventually be split from the leaf node c6eaa. This child node is expected to have the node identifier "1c550", a max-key value of k92, and respective entries for list keys k88 and k92.

To reduce clutters, empty elements of a node may not be shown in the node's descriptor in much of the following description. For example, the empty square brackets shown in leaf node 520 of FIG. 5 to indicate that there are no child references may be eliminated, and the leaf node may be represented as "c6eaa(k83) [k76, k79, k8, k83] [1c550(k92) [k88, k92]]". Similarly, the empty square brackets indicating the lack of key entries and the lack of deferred split descriptors may be eliminated from the root node's representation, leaving the string "root( ) [c67267(k58), a42321 (k89), g23325( )]". If the text within a square brackets contains an embedded square bracket pair, the content within the outer square brackets represent a deferred split descriptor in the following discussion; otherwise (without an embedded square bracket pair) the content within the square brackets represent a set of list key entries.

Initial Inserts into an Empty Index

FIG. 6-FIG. 10 show examples of operations which may be performed at various levels of a list key index in response to insert requests. For each insert example, four types of data are shown: (a) the list key for which the entry is to be inserted, (b) the nodes that may be read from the data store (displayed in the order in which they are read, thus indicating the path to the candidate destination node), (c) the contents of the critical write whose successful completion is a prerequisite for the insert operation to be considered complete, and (d) the content of the non-critical writes which may be attempted by the index handler in addition to the critical write. The non-critical writes may correspond to deferred work left undone during earlier index updates (e.g., an update to a child reference list, a removal of a non-longer needed deferred split descriptor, or an actual split operation corresponding to a deferred split descriptor) and/or to new work that is a side effect or consequence of the present index update operation. In some embodiments in which multi-threaded index handlers are used, the critical write for an insert may be performed by a different thread than the thread(s) which perform the non-critical writes. The many different kinds of critical and non-critical or deferred writes that may be implemented in the algorithm may best be explained using simple examples of the types shown in FIG. 6-FIG. 10. To simplify the discussion, the phrase "key X" may be used as a logically equivalent version of the phrase "the entry for key X". For similar reasons, a node may be referred to by its identifier—that is, the phrase "node Y" may be used as the logical equivalent of the phrase "the node with identifier Y". Furthermore, if a node has an empty element (e.g., no child-node references or no deferred split descriptors), that element may not be shown in the nodes' representation in FIG. 6-FIG. 10.

FIG. 6 illustrates examples of reads and writes associated with the first few entries inserted into an index, according to at least some embodiments. In example 601, the first entry, for key k8, is inserted into an empty tree. Since the tree is empty, no read is possible or required. A root node comprising the entry for k8 is stored as the critical write. There are no non-critical writes.

In example 603, when a request to insert key k88 is received by the index handler, the root node (which is shown in the state it was in at the end of example 601) may be read in from the back-end data store. The critical write comprises a modified version of the root node, with the new key k88 added. Once again, there are no non-critical writes. Similarly, two more keys k69 and k58 are added to the root node in examples 605 and 607 respectively, with the split criterion for the root node not being met and no non-critical writes being identified or attempted.

Example Operations at Root Nodes

FIG. 7 illustrates examples of reads and writes associated with splitting a root node of an index, according to at least some embodiments. In example 701, the insert of k63 is requested at a point of time when the root node already contains four entries (k58, k69, k8 and k88). The split criterion for the root would be met if k63 were to be inserted. Because the node whose split criterion is met is the root node, two deferred split descriptors are created in the depicted example as indicated by arrow 720. Respective node identifiers "c796f" and "c6eaa" are generated for the two to-be-split nodes. The new key (k63) and set of keys which were already present in the root node are divided into approximately equal subsets, with one subset being included in each DSD. Thus, to-be-split node c796f gets keys k58, k63 and k69, and the max-key for c796f is k69, while to-be-split node c6eaa gets keys k8 and k88 and has a max-key value of infinity (since in principle, all key values after k69 according to the dictionary sort order would be found by following a sub-path rooted at c6eaa. The modified version of the root, with the two embedded DSDs, would constitute the contents of the critical read, and there are still no non-critical reads to be attempted by the node which responds to the insert of k63.

At some point after the critical write of example 701 completes, a request to insert k9 is received, as shown in example 703. This insert may be processed by a different index handler than the index handler of example 701 with non-zero probability in at least some embodiments. For example, if there are N index handlers among which insert requests are distributed using random selection, the probability that the same index handler is used for inserting k63 and k9 would be 1/N. Since there is still only one node in the index, the root node is read in as the candidate destination node for k9. However, the root node has already met its split criterion and now comprises two DSDs. Among the DSDs, the one with node identifier c796f has a max-key value of k69. The key to be inserted, k9, falls outside the range of the DSD with node identifier c796f, and within the range (all values after k69 in dictionary order) of the DSD with node identifier c6eaa. Accordingly, the index handler determines that the actual split of c6eaa should be attempted, after adding k9 to c6eaa. Note that even though the root node had two DSDs, only one of the DSDs (the one in whose key range the newly-inserted key lies) is considered a critical write in example 703, as indicated by arrow 725. The second actual split, corresponding to the second DSD (with node identifier c796f) is considered a non-critical write. In addition, an updated root node with the DSDs removed and replaced by child node pointers for c796f and c6eaa may also be considered a non-critical write. Each of the three writes (one critical, and two non-critical) resulting from the insert of k9 may be attempted using the conditional write operations of the back-end store.

After the root node has been split with the help of the three writes shown in example 703, additional inserts may result in the modifications of the root's child nodes c6eaa (in example 705, in which k83 is inserted) and c796f (in example 707, in which k10 is added). Each of the inserts may result in two reads (the root node and the appropriate child node) and zero non-critical writes.

Example Operations at Leaf Nodes

FIG. 8 illustrates examples of reads and writes associated with splitting a leaf node of an index, according to at least some embodiments. In each of examples 801 and 803, a leaf node would meet its split criterion if a new key were added. In contrast to the scenario shown in example 701, where it was the root node whose split criterion was met and two deferred split descriptors were embedded, only one deferred split descriptor may be embedded in a leaf node when the leaf's split criterion is met (as indicated by arrows 821). The total set of keys post-insert (i.e., the pre-existing keys combined with the key being inserted) may be arranged in sort order, and approximately half of the keys at the upper or tail end of the sort may be included in the DSD. In example 801, the insertion of k76 to a leaf node (with node ID c6eaa) which already contains k8, k83, k88 and k9 causes the split criterion of the leaf node to be met. The sorted keys k76, k8, k83, k88 and k9 split into a head-end (lower in the sport sequence) group (k76, k8, k83) with about half the total number of keys, and a tail-end group (k88, k9) with the remaining keys. The tail-end group is included in the DSD for a new to-be-inserted node with ID 1c550 in the depicted embodiment. Similarly, in example 803, a DSD with a newly-generated ID f0d30 and the tail-end keys k63 and k69 is embedded in the destination leaf node.

Note that, after the critical write of a modified leaf node with an embedded DSD is completed (e.g., the write of c6eaa on example 801), the max-key value of the leaf node is adjusted (changed from infinity to k83 in the c6eaa case), but the child-node reference in the parent node remains unchanged (the root node still indicates that c6eaa's max-key is infinite). The update of the parent's reference may be identified as a deferred write operation by some other index handler during a tree traversal performed in response to a future insert request.

Example 805 presents a scenario in which a deferred split of a leaf node is performed—that is, a node previously indicated as a to-be-split node in a DSD is actually split from a leaf node. The node written to the back-end data store as a result of implementing the deferred split indicated in a DSD may be referred to herein as a "split-result" node. Key k59 is to be inserted, and the candidate destination node is leaf node c796f which already has a deferred split descriptor in it. Furthermore, the new key k59 falls in the range of the DSD. As a result, the write of the to-be-split node (comprising k59) is considered the critical write. The removal of the DSD from the leaf node is deferred, as indicated by arrow 823. The update to the parent node of the split-result node is attempted as a non-critical write (arrow 825)—in example 805, this parent node is the root node.

FIG. 9 illustrates examples of reads and writes associated with managing a leaf node of an index when the leaf node contains a deferred split descriptor, according to at least some embodiments. In example 901, the candidate destination node for the insert of k79 is identified as the leaf node with identifier c6eaa, which contains a DSD with a node identifier 1c550 and a key range starting beyond k83. Note that the root node has the incorrect max-key value for c6eaa (infinity instead of k83) at the time that the insert request for k79 is received. Because the key to be inserted (k79) isn't in the key range of the DSD, the critical write simply comprises of the leaf node itself, modified by adding k79. That is, despite the fact that the candidate destination node had already met its split criterion during the processing of an earlier operation, the actual split is once again deferred as a non-critical write because the new key being inserted is not within the DSD's key range. The non-critical writes in example 901 also include (in addition to the actual split of 1c550) a correction of the child references of the root node. In the corrected version of the root node, the max-key value for c6eaa is updated, and a new child pointer to the split-result node 1c550 is added.

After the three writes (one critical and two non-critical) of example 901 are successful, the c6eaa node may still comprise its DSD, as the DSD was not removed despite the actual split of the 1c550 node. Such a DSD, which remains in the node into which it was embedded even after the to-be-split node of the DSD is written to the data store in an actual split, may be referred to as a stale DSD. Example 903 shows an example of a removal of a stale DSD from a leaf node as part of the processing of an insert into that leaf node. In this example, k56 is to be inserted, and the candidate destination node is c796f which contains a (stale) DSD with identifier f0d30 as indicated by arrow 923. Since the parent of the candidate destination node already has an entry for f0d30 as a child node, the index handler determines that the DSD is stale, and removes it when it performs the critical write of c796f with the newly-inserted key k56. In addition, the index handler may have determined that the parent node of c796f, which is the root node, has enough entries for split descriptors to be embedded in it. As a consequence, two new DSDs may be embedded into the root node in a non-critical write, with node identifiers 3fe19 and c5ddf respectively (arrow 925).

Example Operations at Intermediate Nodes

FIG. 10 illustrates examples of reads and writes associated with managing intermediate (non-leaf, non-root) nodes of an index, according to at least some embodiments. In example 1001, the index handler may detect, during the traversal to a leaf node at which a critical write for the key (k93) being inserted is performed, that the root node has two DSDs waiting to be split. Accordingly, intermediate nodes corresponding to each of the two DSDs may be written to the data store as non-critical writes after the critical write is initiated.

At the point of time at which the insert of k43 is attempted in example 1003, an intermediate node 3fef9 traversed during the navigation to the candidate destination node 68723 already contains six entries, and does not yet have a DSD. The index handler may determine that node 3fef9 is ready for a DSD to be embedded, and may make this modification to node 3f3f9 as part of a non-critical write. In the critical write shown in example 1003, two changes are made to the node 68723. First, a stale DSD with identifier d23214 is discarded (the index handler may determine that this DSD is stale because the parent node already contains a reference to d23214). Second, a new DSD (with node identifier 6960e) is embedded in node 67823 as it meets its split criterion due to the insertion of k43.

Example 1005 represents a scenario in which a proportional-effort policy regarding non-critical writes may be implemented. In the depicted embodiment, such a policy may have the overall goal that the total number of writes performed by an index handler for a given insert request should be, in general, kept as close to the average number of writes per insert as possible. Thus, for example, it may be the case that after the index reaches a reasonable size, the average number of non-critical writes performed per write is between two and three. As such, if during the processing of an insert request, an index handler is able to identify some number of non-critical writes which are not directly associated with (or caused by) the critical write being performed for the insert, that index handler should attempt approximately the average number of non-critical writes. Since the non-critical writes are typically performed to balance and fix up the tree (e.g., to correct inaccurate child references), this means that all the index handlers would participate to a roughly equal extent in balancing and fix-up operations. In example 1005, the newly inserted key k17 can simply be added to node 61fcd in a critical write, and the index handler does not have to perform any non-critical writes associated with node 61fcd itself. However, during the traversal of the index down to 61fcd, the index handler may have noted that the intermediate node 3fef9 has a DSD whose split is yet to be implemented. Because there are no non-critical writes associated with the insert of k17 to its candidate node, the two non-critical writes shown may be attempted in view of the proportional-effort policy in the depicted embodiment. The proportional-effort policy may also be used in some embodiments when, during the processing of a given insert, more non-critical writes are identified than the average— e.g., if the average number of non-critical writes is two, and six non-critical writes have been identified, the index handler may only schedule two of the six non-critical writes identified.

Methods for Deleting Index Entries and Reading Entries of List Key Ranges

Figure 11:
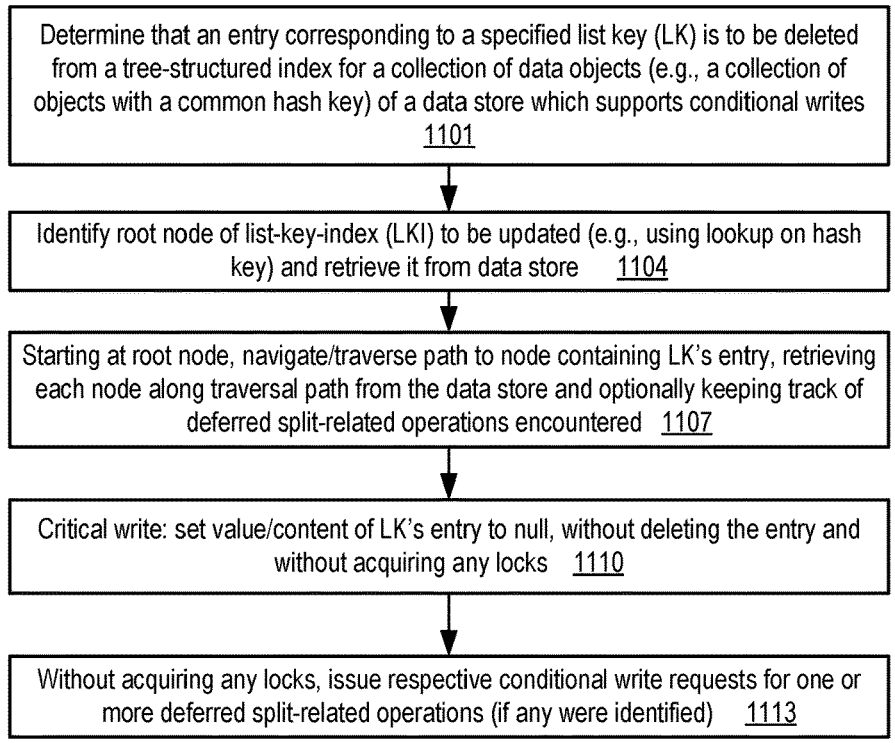
FIG. 11 is a flow diagram illustrating aspects of operations that may be performed to delete an index item, according to at least some embodiments.

In some embodiments, non-critical writes may also be performed when a request to delete an index entry is processed, or when a request to read a range of index entries is processed. FIG. 11 is a flow diagram illustrating aspects of operations that may be performed to delete an index entry, according to at least some embodiments. In the depicted embodiment, index entries may not be removed from the index in response to a delete request; instead, the contents of the entries (i.e., the non-key attribute values) may be zeroed out, without modifying the structure of the tree. As shown in element 1101, a determination may be made that an entry for a list key LK is to be deleted from a tree-structured index associated with a collection of data objects (e.g., objects with a common hash key) stored at a data store which supports conditional write operations. The index handler responsible for responding to the delete request may identify the root node of the list-key index (LKI) which is to be updated to implement the deletion and retrieve the root node from the data store (element 1104). The LKI and its root node may be identified based on the common hash key of the objects of the collection, for example. The index handler may navigate from the root node to the index node containing LK's entry (element 1107), retrieving each additional node from the data store using the child references of the current node. During the traversal, the index handler may keep track of deferred split-related write operations that the index handler may be able to perform after it has completed the deletion. Such operations may include, for example, writes to correct inaccurate child pointers, remove stale deferred split descriptors, implement deferred splits, etc. When the node containing LK's entry is reached, the index handler may set at least some of the contents of LK's entry (e.g., the non-key attribute values) to null or zeroes, without actually deleting the entry from the tree (element 1110). This modification may constitute a critical write, and may be initiated by submitting a conditional write request to the data store, without acquiring any locks. After the write containing the updated LK entry succeeds, the index handler may initiate zero or more non-critical writes (again, without acquiring any locks) corresponding to the deferred operations it has tracked during the processing of the delete request (element 1113).

Figure 12:
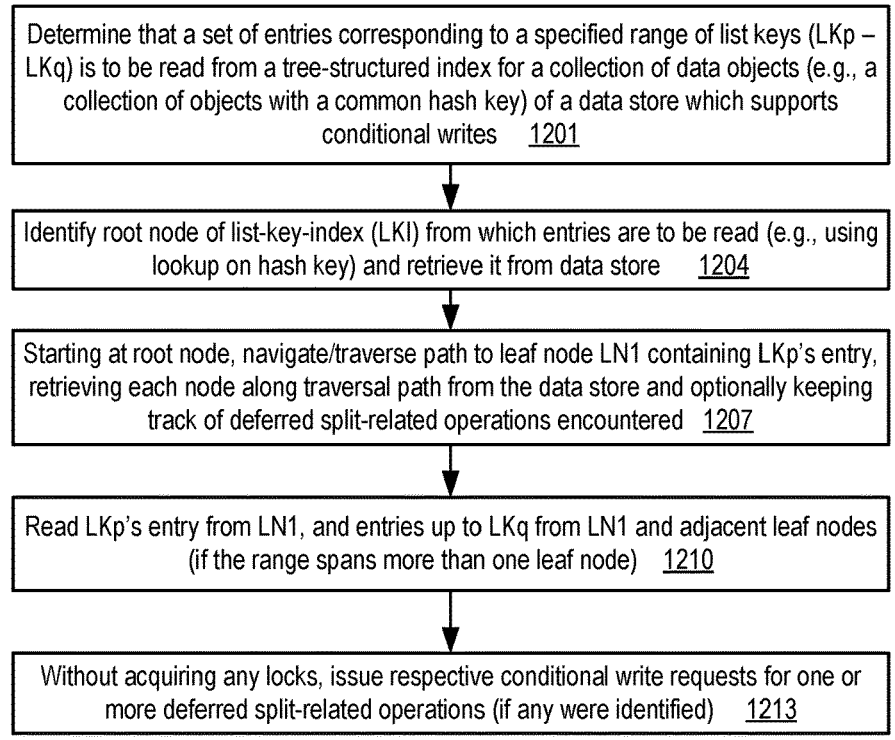
FIG. 12 is a flow diagram illustrating aspects of operations that may be performed to retrieve entries associated with a range of list keys, according to at least some embodiments.

FIG. 12 is a flow diagram illustrating aspects of operations that may be performed to retrieve entries associated with a range of list keys, according to at least some embodiments. As shown in element 1201, a determination may be made that a set of index entries corresponding to a range of list keys LKp-LKq is to be retrieved from a tree-structured index set up for a collection of data objects of a data store which supports conditional writes. The root node of the index may be identified, e.g., using a common hash key associated with the collection of data objects, and retrieved from the data store (element 1204) by the index handler responsible for processing the range query (element 1204). Nodes along the path to the leaf node LN1 containing LKp may be retrieved from the data store, and the index handler may keep track of outstanding deferred split related operations as it navigates to LN1 (element 1207). The index entries for the LKp-LKq range may be retrieved in order from LN1 and (depending on how many entries there are in the range) some number of logically adjacent leaf nodes of the index (element 1210). If the index handler has identified any deferred operations during the processing of the range query, such operations may be initiated using conditional writes to the data store, without acquiring any locks (element 1213).

It is noted that in various embodiments, at least some operations other than those illustrated in the flow diagrams of FIG. 3, FIG. 4, FIG. 11 and FIG. 12 may be used to implement the lock-free indexing techniques described above. Some of the operations shown may not be implemented in some embodiments or may be implemented in a different order, or in parallel rather than sequentially.

Use Cases

The techniques described above, of supporting immediately consistent indexes for data object collections without acquiring locks may be useful in a variety of embodiments. Many large applications, such as Internet-scale retailing-related applications, may utilize non-relational data stores which do not natively provide support for multi-write transactions, and in some cases may not support traditional database locking. Such data stores may be used, at least in some cases, partly because they provide much higher throughputs and lower response times for certain types of operations than can be supported by relational databases for large amounts of data. Some of the non-relational data stores may provide support for conditional writes implementing the "read-modify-write" model, in which a conditional write to an object may fail if the version of the object that was read has been modified (e.g., on behalf of some other writer) since it was read. The techniques outlined herein, of identifying a single critical write corresponding to each update to a tree-structured index, deferring split operations by embedding split descriptors into index nodes, and "fixing up" the tree structure using non-critical writes, may enable high concurrency levels to be supported efficiently without sacrificing consistency.

Illustrative Computer System

Figure 13:
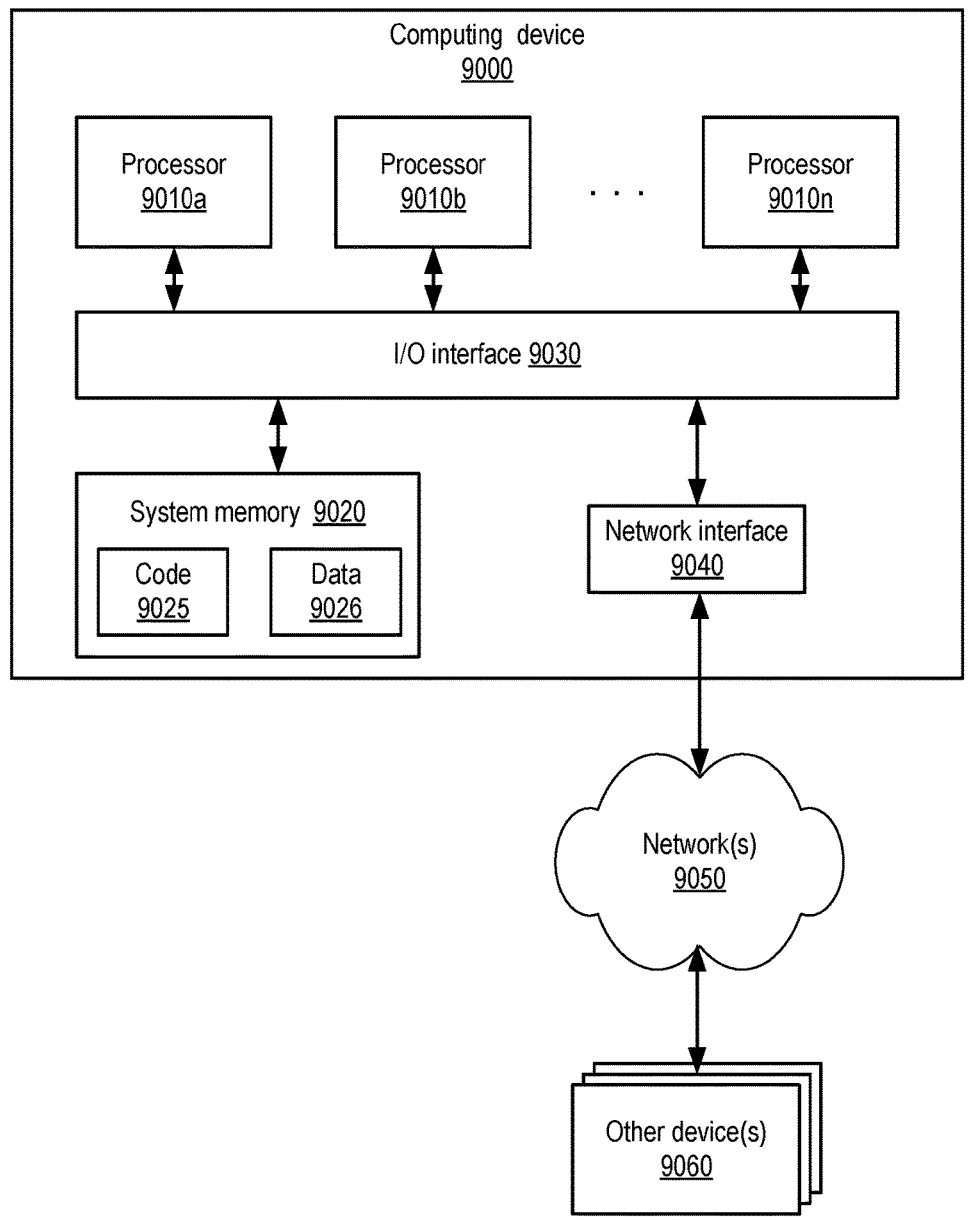
FIG. 13 is a block diagram illustrating an example computing device that may be used in at least some embodiments.

In at least some embodiments, a server that implements a portion or all of one or more of the technologies described herein, including the techniques to implement index handlers, storage servers, base data object handlers, request routers and the like may include a general-purpose computer system that includes or is configured to access one or more computer-accessible media. FIG. 13 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 12, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 12 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 13 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more processors; and
memory, comprising program instructions that when executed by the one or more processors implement:
a plurality of index handlers associated with a key-value data store, including a first index handler implemented at a first computing device, and a second index handler, wherein individual ones of objects of the key-value data store are identified by a combination of a hash key and a list key;
wherein the first index handler is configured to:
determine that an entry corresponding to a particular list key is to be inserted in a first tree-structured index corresponding to a data object collection of the data store, wherein the collection is associated with a particular hash key;
identify a traversal path within the first tree-structured index to a first candidate destination node for the entry;
in response to determining that the first candidate destination node meets a first split criterion,
generate a new node identifier;
add at least a first deferred split descriptor to the first candidate destination node, wherein the first deferred split descriptor includes (a) the new node identifier and (b) the entry corresponding to the particular list key;
verify, prior to generating an insert-completed response corresponding to the particular list key, that the modified first candidate destination node has been written successfully to the data store, wherein the modified first candidate destination node is written to the data store without an acquisition of a lock; and
transmit the insert-completed response without verifying that the entry corresponding to the particular list key has been stored at the data store within a node other than the first candidate destination node;
wherein the second index handler is configured to:
retrieve the modified first candidate destination node from the data store;
identify, based at least in part on an analysis of the first deferred split descriptor, contents of a split-result node to be added to the tree-structured index, wherein the contents of the split-result node include at least the entry corresponding to the particular list key; and
initiate, without acquiring a lock, a write of the split-result node to the data store.

2. The system as recited in claim 1, wherein the first index handler is configured to:
identify, in addition to the write of the first candidate destination node, one or more deferred write operations during a traversal of the tree-structured index; and
initiate, after generating the insert-completed response, at least one write operation of the one or more deferred write operations.

3. The system as recited in claim 1, wherein the second index handler is configured to retrieve the modified first candidate destination node from the data store in response to a determination that an entry corresponding to a different list key is to be inserted into the tree-structured index.

4. The system as recited in claim 1, wherein the first index handler is configured to:
after adding at least the first deferred split descriptor to the to the first candidate destination node, issue a conditional write request comprising the modified candidate destination node to the data store, wherein the conditional write request indicates an expected state of the candidate destination node, wherein the expected state corresponds to a version of the candidate destination node which was read by the first index handler from the data store prior to adding the first deferred split descriptor; and
to verify that the modified first candidate destination node has been written successfully to the data store, confirm that the conditional write request has succeeded.

5. The system as recited in claim 1, wherein the first index handler is configured to:
determine a number of deferred split descriptors to be included in the candidate destination node based at least in part on a depth of the candidate destination node within the tree-structured index.

6. A method, comprising:
performing, by a first index handler of a plurality of index handlers associated with a data store, wherein the first index handler is implemented at a first computing device:
determining that an entry corresponding to a particular key is to be inserted in a first tree-structured index associated with a particular data object collection of the data store;
in response to determining that a first candidate destination node of the first tree-structured index meets a first split criterion,
modifying the first candidate destination node to include at least a first deferred split descriptor, wherein the first deferred split descriptor includes the entry corresponding to the particular key;
verifying, prior to generating an insert-completed response corresponding to the particular key, that the modified first candidate destination node has been written successfully to the data store; and
transmitting the insert-completed response without verifying that the entry corresponding to the particular key has been stored at the data store within a node other than the first candidate destination node; and
performing, by a second index handler of the plurality of index handlers:
identifying, based at least in part on an analysis of the first deferred split descriptor, contents of a split-result node to be added to the tree-structured index, wherein the contents of the split-result node include at least the entry corresponding to the particular key; and
initiating a write of the split-result node to the data store.

7. The method as recited in claim 6, wherein said verifying that the modified first candidate destination node has been written successfully comprises:
receiving a write-succeeded response to a conditional write request issued to the data store by the first index handler.

8. The method as recited in claim 6, further comprising performing, by the second index handler:
prior to said identifying contents of the split-result node, determining that a second entry, corresponding to a different key, is to be inserted into the tree-structured index;

determining that the different key lies within a key range indicated in the deferred split descriptor; and verifying, prior to generating an insert-completed response corresponding to the different key, that the split-result node has been written successfully to the data store, wherein the split-result node includes the second entry.

9. The method as recited in claim 6, further comprising performing, by the second index handler:

initiating, asynchronously with respect to the write of the split-result node to the data store, an update to a parent node of the split-result node, wherein the update includes a change to one or more of: (a) a child node key-range indicator or (b) a child-node reference list stored within the parent node.

10. The method as recited in claim 9, wherein the second index handler comprises a plurality of threads of execution including a first thread of execution and a second thread of execution, wherein said initiating the write of the split-result node to the data store is performed by the first thread of execution, and wherein said initiating the update to the parent node is performed by the second thread of execution.

11. The method as recited in claim 6, further comprising performing, by the second index handler:

identifying, based on an examination of one or more nodes of the tree-structured index, a plurality of deferred operations to be initiated to update the index, including a first deferred operation and a second deferred operation;

selecting, based at least in part on an proportional-effort policy associated with the tree-structured index, a subset of deferred operations of the plurality of deferred operations to be initiated by the second index handler, wherein the subset includes the first deferred operation, and wherein the subset excludes the second deferred operation; and initiating the first deferred operation.

12. The method as recited in claim 6, further comprising performing, by the first index handler:

retrieving a particular node of the tree-structured index, wherein the particular node comprises a second deferred split descriptor;

determining, based on an analysis of a child node list of a parent node of the particular node, that a second split-result node corresponding to the second deferred split descriptor has been stored at the data store; and initiating a write of the particular node to the data store after removing the second deferred split descriptor from the particular node.

13. The method as recited in claim 6, wherein said determining that the first candidate destination node of the first tree-structured index meets the first split criterion further comprising performing, by the first index handler:

determining a depth of the first candidate destination node within the first tree-structured index; and comparing the number of entries in the first candidate destination node with a maximum number of entries permitted for the depth, wherein the maximum number of entries permitted for a first depth differs from the maximum number of entries permitted for a second depth.

14. The method as recited in claim 6, wherein the data store comprises a key-value store, wherein an object stored within the key-value store is identified by (a) a hash key and (b) a list key, wherein the particular data object collection comprises a plurality of data objects with a common hash key, and wherein the particular key is a list key.

15. The method as recited in claim 6, further comprising performing, by the first index handler:

determining that, in response to a particular insert request corresponding to a second key, a plurality of write operations are to be initiated to the data store, including a first write operation corresponding to a first node of the tree-structured index and a second write operation corresponding to a second node of the tree-structured index;

receiving an indication from the data store that a first conditional write request corresponding to the first write operation has failed; and issuing a second conditional write request corresponding to the second write operation after receiving the indication that the first conditional write request has failed.

16. A non-transitory computer-accessible storage medium storing program instructions that when executed on one or more processors implement a particular index handler associated with a data store, wherein the particular index handler is configured to:

determine that an entry corresponding to a particular key is to be inserted in a first tree-structured index associated with a particular data object collection of the data store;

in response to determining that a first candidate destination node corresponding to the particular key meets a first split criterion, modify the first candidate destination node to include at least a first deferred split descriptor, wherein the first deferred split descriptor includes the entry corresponding to the particular key;

verify, prior to generating an insert-complete response corresponding to the particular key, that the modified first candidate destination node has been written successfully to the data store; and transmit the insert-complete response without verifying that the entry corresponding to the particular key has been stored at the data store within a node other than the first candidate destination node; and traverse, in response to a request for an operation corresponding to a second key, one or more nodes of the first tree-structured index;

detect a second deferred split indicator in a particular node of the one or more nodes, wherein the second deferred split indicator includes an entry corresponding to a third key; and initiate a write to the data store of an additional node of the first tree-structured index, wherein the additional node includes the entry corresponding to the third key.

17. The non-transitory computer-accessible storage medium as recited in claim 16, wherein to verify that the modified first candidate destination node has been written successfully, the particular index handler is configured to:

determine that a write-succeeded response has been provided to a conditional write request directed to the data store.

18. The non-transitory computer-accessible storage medium as recited in claim 16, wherein the data store comprises a key-value store, wherein an object stored within the key-value store is identified by (a) a hash key and (b) a list key, wherein the particular data object collection comprises a plurality of data objects with a common hash key, and wherein the particular key is a list key.

19. The non-transitory computer-accessible storage medium as recited in claim 16, wherein, within a particular node of the tree-structured index, wherein the particular node comprises respective entries for a plurality of keys, the respective entries are stored in sorted order of the plurality of keys.

20. The non-transitory computer-accessible storage medium as recited in claim 16, wherein the particular index handler is configured to:
   in response to determining that a root node of the first tree-structured index meets a split criterion,
      generate a first child node identifier and a second child node identifier; and
      store a modified version of the root node at the data store, wherein the modified version of the root node comprises: (a) a first deferred split descriptor comprising the first child node identifier and (b) a second deferred split descriptor comprising the second child node identifier.

21. The non-transitory computer-accessible storage medium as recited in claim 16, wherein to determine that the first candidate destination node meets the first split criterion, the particular index handler is configured to:
   compute a metric based at least in part on one or more of: (a) a number of keys whose entries are included in the first candidate destination node, (b) an aggregate size of the entries included in the first candidate destination node, (c) a timing of one or more operations performed on the candidate destination node; and
   compare the metric to a threshold.

* * * * *